United States Patent
Aiello

(10) Patent No.: US 7,856,719 B2
(45) Date of Patent: Dec. 28, 2010

(54) SINGLE THRUST BEARING FLUID DYNAMIC BEARING MOTOR

(75) Inventor: Anthony Joseph Aiello, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 199 days.

(21) Appl. No.: 11/933,212

(22) Filed: Oct. 31, 2007

(65) Prior Publication Data

US 2008/0056105 A1  Mar. 6, 2008

Related U.S. Application Data

(63) Continuation of application No. 10/263,403, filed on Oct. 2, 2002, now Pat. No. 7,318,674.

(60) Provisional application No. 60/364,072, filed on Mar. 13, 2002, now abandoned.

(51) Int. Cl.
*B21K 1/10* (2006.01)
*B21D 53/10* (2006.01)
*F16C 32/02* (2006.01)
*G11B 23/00* (2006.01)
*H02K 5/00* (2006.01)
*H02K 5/16* (2006.01)

(52) U.S. Cl. .................. 29/898.02; 29/898.07; 310/90; 310/90.5; 369/269; 384/100; 384/107; 384/112

(58) Field of Classification Search ............ 29/898.02, 29/898.07; 310/90, 90.5; 369/269; 384/100, 384/107, 112
See application file for complete search history.

(56) References Cited

U.S. PATENT DOCUMENTS

| 4,200,344 A | 4/1980 | Binns et al. |
| 4,538,081 A | 8/1985 | Kamiya et al. |
| 5,089,732 A * | 2/1992 | Konno et al. ............ 384/107 |
| 5,112,141 A | 5/1992 | Asada et al. |

(Continued)

OTHER PUBLICATIONS

International Search Report mailed on Jul. 22, 2003 for PCT patent application No. PCT/US03/07434 filed on Mar. 12, 2003, 3 pages.

(Continued)

*Primary Examiner*—David P Bryant
*Assistant Examiner*—Alexander P Taousakis

(57) ABSTRACT

A typical dynamic bearing design comprises a ring shaped or circular thrust plate mounted at or near the end of a shaft, the shaft defining together with a surrounding sleeve a journal bearing by providing grooves on only one of the two surfaces facing the gap between the shaft and sleeve. On the ring shaped thrust plate supported by the shaft, the traditional upward thrust bearing defined between the lower face of the thrust plate and the facing surface of the sleeve is maintained; but no grooves are on the surface of the thrust plate distant from the shaft and a facing counterplate surface. Further, the journal bearing is defined to have an asymmetry so that a bias force pressure along the surface of the shaft toward the thrust plate is established. The combination of the journal groove asymmetry pumping action toward the shoulder or thrust plate, together with the single grooved thrust bearing, is sufficient to establish a constant pressure between the distal surface of the thrust plate and the facing counterplate, as well as between the groove thrust plate and the facing shoulder surface.

9 Claims, 3 Drawing Sheets

U.S. PATENT DOCUMENTS

| | | |
|---|---|---|
| 5,142,173 A | 8/1992 | Konno et al. |
| 5,357,163 A | 10/1994 | Minakuchi et al. |
| 5,426,548 A | 6/1995 | Fujii et al. |
| 5,427,456 A | 6/1995 | Hensel |
| 5,524,985 A | 6/1996 | Dunfield |
| 5,678,929 A * | 10/1997 | Parsoneault et al. ......... 384/112 |
| 5,683,183 A | 11/1997 | Tanaka et al. |
| 5,723,927 A | 3/1998 | Teshima |
| 5,791,785 A | 8/1998 | Nose et al. |
| 5,806,987 A | 9/1998 | Nose et al. |
| 5,914,832 A | 6/1999 | Teshima |
| 6,034,454 A | 3/2000 | Ichiyama |
| 6,066,903 A * | 5/2000 | Ichiyama ..................... 310/90 |
| 6,183,135 B1 | 2/2001 | Kloeppel et al. |
| 6,188,152 B1 | 2/2001 | Wakitani et al. |
| 6,205,110 B1 | 3/2001 | Miyamoto et al. |
| 6,211,592 B1 | 4/2001 | Ichiyama |
| 6,250,807 B1 * | 6/2001 | Mori et al. .................. 384/100 |
| 6,270,431 B1 | 8/2001 | Martin |
| 6,296,391 B1 | 10/2001 | Hayakawa et al. |
| 6,339,270 B1 | 1/2002 | Ichiyama |
| 6,364,532 B1 | 4/2002 | Yoshikawa et al. |
| 6,524,006 B1 * | 2/2003 | Lee ............................ 384/107 |

OTHER PUBLICATIONS

Restriction / Election Requirement Office Action Dated Jan. 21, 2004; U.S. Appl. No. 10/214,980.
Non-Final Office Action Dated May 4, 2004; U.S. Appl. No. 10/214,980.
Final Office Action Dated Jan. 13, 2005; U.S. Appl. No. 10/214,980.
Restriction / Election Requirement Office Action Dated Apr. 14, 2004; U.S. Appl. No. 10/263,403.
Non-Final Office Action Dated Jul. 21, 2004; U.S. Appl. No. 10/263,403.
Notice of Allowance Dated Feb. 3, 2005; U.S. Appl. No. 10/263,403.
Supplemental Notice of Allowance Dated May 17, 2005; U.S. Appl. No. 10/263,403.
Non-Final Office Action Dated May 25, 2005; U.S. Appl. No. 10/263,403.
Final Office Action Dated Jan. 5, 2006; U.S. Appl. No. 10/263,403.
Advisory Action Dated May 5, 2006; U.S. Appl. No. 10/263,403.
Non-Final Office Action Dated Jun. 20, 2006; U.S. Appl. No. 10/263,403.
Advisory Action Dated Apr. 10, 2007; U.S. Appl. No. 10/263,405.
Final Office Action Dated Jan. 22, 2007; U.S. Appl. No. 10/263,403.
Notice of Allowance Dated Aug. 17, 2007; U.S. Appl. No. 10/263,403.

* cited by examiner

SINGLE THRUST BEARING FLUID DYNAMIC BEARING MOTOR

CROSS REFERENCE TO RELATED APPLICATIONS

This application is a continuation of U.S. patent application Ser. No. 10/263,403, now U.S. Pat. No. 7,318,674, filed Oct. 2, 2002, by Anthony Joseph Aiello. U.S. patent application Ser. No. 10/263,403 claims the benefit of U.S. Provisional Application No. 60/364,072, filed Mar. 13, 2002 now abandoned, by Anthony Joseph Aiello; this application is incorporated herein by reference.

FIELD OF THE INVENTION

The invention relates generally to the field of fluid dynamic bearings, and more particularly to a design which includes a simplified thrust bearing design.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write heads generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearing systems to a motor shaft disposed in the center of the hub. The bearings are spaced apart, with one located near the top of the spindle and the other spaced a distance away. These bearings support the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system.

Further, mechanical bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a stationary shaft supported from the base of the housing, and the rotating spindle or hub. Liquid lubricants comprising oil, more complex fluids, or other lubricants have been utilized in such fluid dynamic bearings The reason for the popularity of the use of such fluids is the elimination of the vibrations caused by mechanical contact in a ball bearing system, and the ability to scale the fluid dynamic bearing to smaller and smaller sizes.

In this field of fluid dynamic bearing motors for use in hard disk drives, some prior systems including, but not limited to, small form factor motor designs which are especially useful in mobile applications have been limited by stringent power specifications or requirements. In the well known single plate fluid dynamic bearing design, which typically comprises a ring or plate with two equally opposing thrust bearings defined on opposite axially directed surfaces of the bearing, the ring is affixed to a shaft which has a journal bearing defined thereon; the thrust bearings provide axially stiffness, and the journal bearing radial stiffness. However, this typically results in bearing gaps between the thrust plate surfaces and the facing surface of the shaft or sleeve and counterplate, which have large diameters, increasing the bearing drag and consuming considerable power at motor startup due to the viscosity of the fluid in the bearing gap especially when the motor is cold. Accordingly, it would be advantageous to modify the single plate thrust plate bearing design to minimize the power required and maintain rotation of the shaft and thrust plate relative to a surrounding sleeve.

SUMMARY OF THE INVENTION

The present invention is intended to provide a fluid dynamic bearing assembly especially useful in a high speed spindle motor assembly. A further advantage of the present invention and objective thereof is to provide an improved stiffness to power ratio in a fluid bearing arrangement.

More particularly, the present invention is intended to provide a fluid bearing assembly which diminishes to some extent the power requirements in a thrust plate fluid bearing design.

These and other advantages and objectives are achieved by modifying a typical dynamic bearing design which comprises a ring shaped or circular thrust plate mounted at or near the end of a shaft, the shaft defining together with a surrounding sleeve a journal bearing by providing grooves on only one of the two surfaces facing the gap between the shaft and sleeve. On the ring shaped thrust plate supported by the shaft, the traditional upward thrust bearing defined between the lower face of the thrust plate and the facing surface of the sleeve is maintained; but no grooves are on the surface of the thrust plate distant from the shaft and a facing counterplate surface. Further, the journal bearing is defined to have an asymmetry so that a bias force pressure along the surface of the shaft toward the thrust plate is established. The combination of the journal groove asymmetry pumping action toward the shoulder or thrust plate, together with the single grooved thrust bearing, is sufficient to establish a constant pressure between the distal surface of the thrust plate and the facing counterplate, as well as between the groove thrust plate and the facing shoulder surface.

In a preferred embodiment, the gap between the shaft adjacent thrust plate surface and the facing sleeve surface should be designed to be relatively small, (in a range from about 2 to 12 microns.

In a further alternative, the ungrooved gap between the counterplate and the facing thrust plate surface and end surface can be relatively large and lower precision, since this interface is not acting as a pressure generating bearing; rather, this gap and the facing surfaces primarily act as a shock displacement limiter, shaft landing zone and journal asymmetry pressurization region subject to pressurization by the journal bearing.

The above preferred embodiments utilize journal asymmetry pumping pressure acting against the surfaces of the thrust plate and especially the ungrooved thrust plate gap as a constant force axially biasing the rotor or shaft such that the grooved surface of the thrust gap closes until axial force equilibrium is achieved. The grooved section of the thrust plate surface can be adjusted to provide additional asymmetry pressure acting on the thrust plate surface.

In summary in a combination of shaft and thrust plate, with only the surface of the thrust plate adjacent to the shaft being grooved, and also including a journal bearing establishing asymmetric pressure which is toward the thrust plate to establish a pressure between the counterplate and upper surface of the thrust plate and thus against the top of the shaft, this creating a self-balancing axially force utilizing a single grooved thrust bearing.

In preferred embodiments, the thrust bearing would be a chevron pattern or a spiral or similar to add pressure to the asymmetric pressure acting on the thrust plate face, although a spiral design, in a preferred form, would include a circulation path across the thrust plate inner diameter.

Other features of the present invention are disclosed discussed and apparent from the following description.

BRIEF DESCRIPTION OF THE DRAWINGS

For a fuller understanding of the present invention, reference is made to the accompanying drawings in the following detailed description, wherein.

DETAILED DESCRIPTION OF A PREFERRED EMBODIMENT

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disc drive which is illustrated. On the contrary, the invention is intended to cover alternatives, modifications and equivalents which may be included within the spirit and scope of the invention as defined by the attached claims. Further, both hard disc drives, in which the present invention is especially useful, and spindle motors, where the invention is also especially useful are both well known to those of skill in this field. In order to avoid confusion while enabling those skilled in the art to practice the claimed invention, this specification omits such details with respect to known items.

Figure 1:
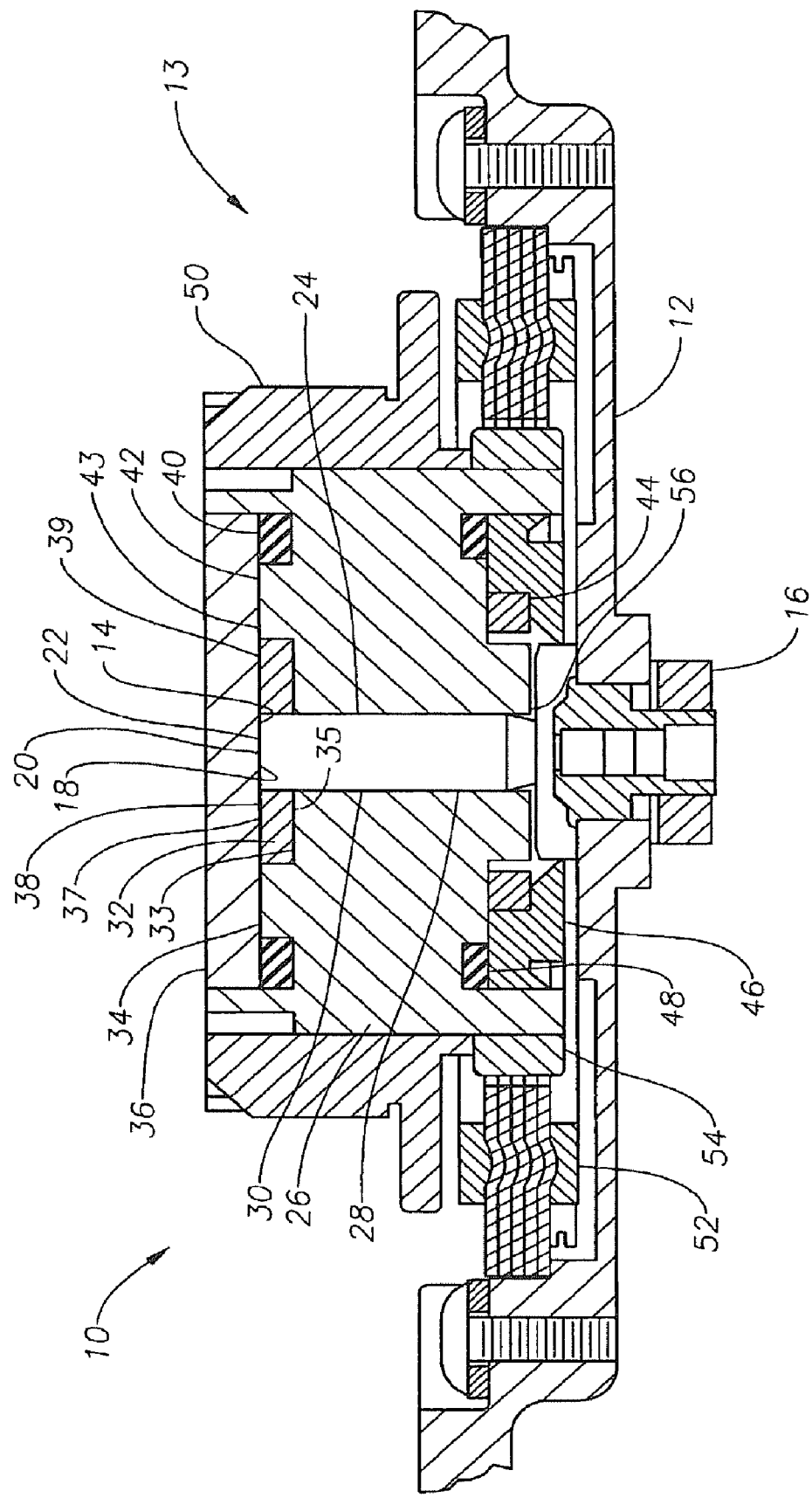
FIG. 1 is an elevation view and cross section of a computer hard disk spindle motor assembly taken along the axis of rotation of the spindle motor assembly.
Figure 3A:
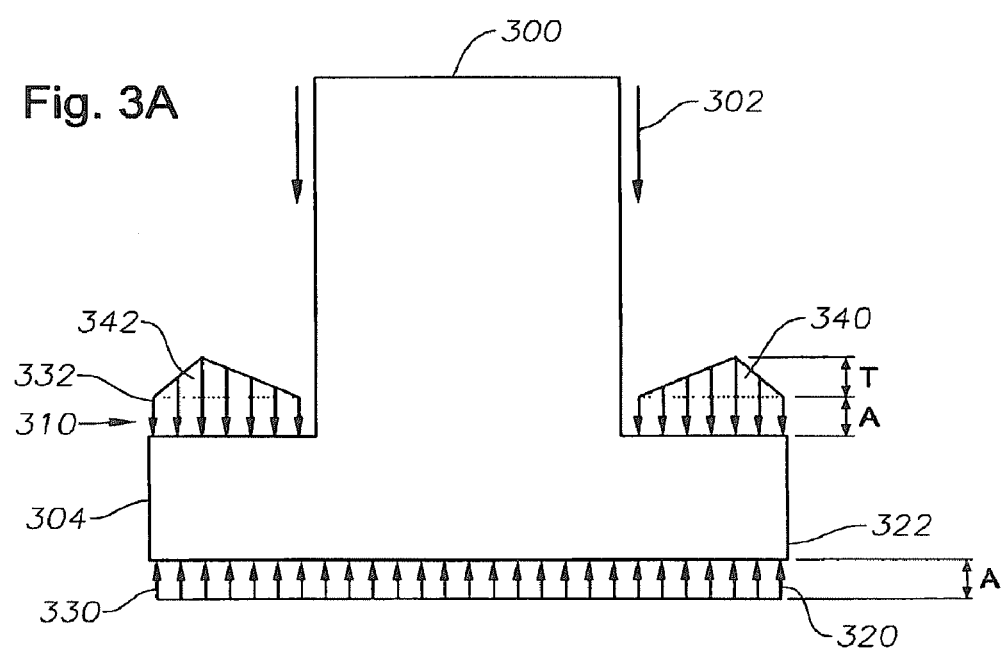
FIGS. 3A, 3B and 3C are vertical sectional views of the shaft, sleeve, thrust plate and counterplate which are used to explain preferred embodiments of the present invention.
Figure 3B:
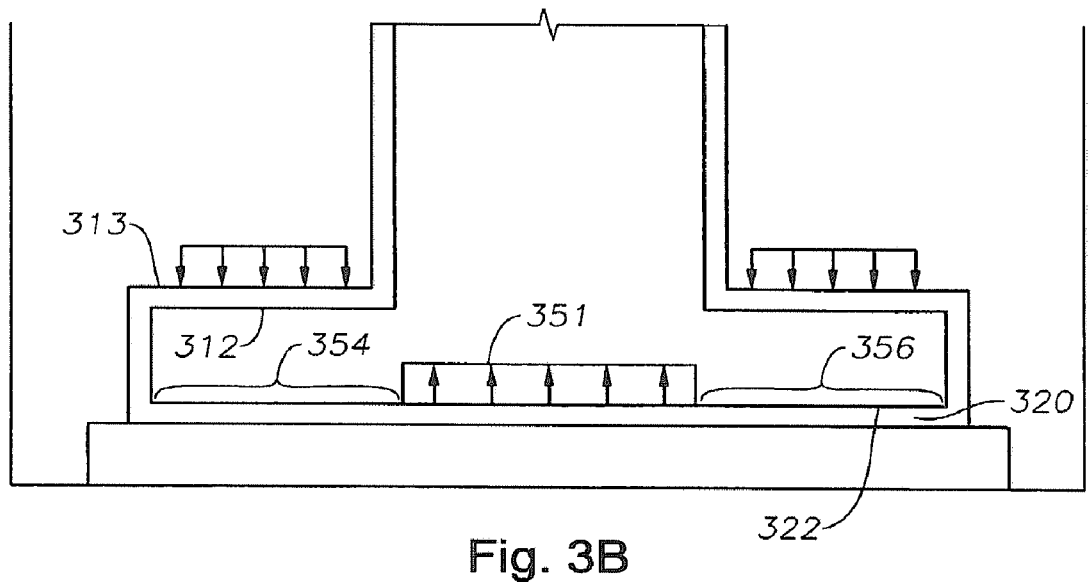

FIG. 1 is a cross section through one embodiment of a spindle motor assembly which may readily be adapted to incorporate a fluid dynamic bearing arrangement according to the present invention. More specifically, the spindle motor shown in FIG. 1 is of a fixed shaft design; whereas FIG. 3A and 3B are used to further illustrate the present invention are both of a rotating shaft design. It will be apparent to a person of skill in the art that the present invention is readily useful with both either a fixed shaft or a rotating shaft design.

FIG. 1 illustrates a cross section through one embodiment of a spindle motor which may be adapted to incorporate a fluid dynamic arrangement according to the invention. The spindle motor assembly, comprises a base 12 and a hub assembly 13. A shaft 14 is mounted to the base 12 by a nut 16.

The outer surface of the shaft 14 and the bore of the journal sleeve 26 together form hydrodynamic journal bearings 28, 30. The dual reference numbers are used because the journal bearings are typically in two sections. The bearing gaps at the hydrodynamic journal bearings, 28, 30 are typically between 0.003 and 0.006 mm. The journal bearings 28, 30 each include a grooved surface. The grooved surfaces may be provided either on the outer surface of the shaft 14, or the inner bore surface of the journal sleeve 26, and journal 28 is typically asymmetric.

A thrust plate 32 is press fitted or formed or otherwise attached to an end of the shaft 14 and extends transversely to the shaft 14. The thrust plate 32 is circular in form, the thrust plate 32 defines a first axial thrust surface 33 which, together with a facing sleeve thrust surface 35 extending transverse to the journal bearing defines a first fluid dynamic thrust bearing 34 in the gap between the two surfaces. As can be seen from FIG. 1, the thrust surface 35 at bearing 34 extends transversely to the journal at 30, and the thrust bearing gap is connected to that journal bore.

A counterplate 36 is press fitted to or otherwise supported by the journal sleeve 26 adjacent the thrust plate surface 37 which is distal from the journal bearing 28, 30. The counterplate 36 has a surface 39 which corporates with the thrust plate surface 37 to define a gap in which fluid is maintained during rotational operation of the shaft and sleeve. Therefore, the counterplate 36 is sealed to the journal sleeve 26 by a O-ring 40 or other means to prevent any loss of the fluid which appears in the gap between counterplate and thrust plate.

It is important to note that in all known prior art designs, a groove pattern was formed on one of the two facing surfaces between counterplate 36 and the distal surface of the thrust plate. However, in the present design, grooving of either surface to establish a pressure as a function of clearance or gap between the two surfaces is not needed. Rather, the pressure in this instance which will establish and maintain fluid in the gap between the two surfaces 37, 39 is established by other means, based on the use of a single thrust bearing in the gap between the thrust plate surface and the facing surface of the sleeve adjacent the journal bearing, and by an asymmetric design of the journal bearing 28 itself. The gap 38 between the counterplate and the distal thrust plate surface is typically about 10 microns or larger; it is at the larger end of bearing gaps, or perhaps even larger because its criticality to creating axial force is not necessary. Rather, the surfaces are relatively smooth and do not require exact smoothness or polishing because of the lack of grooves. Rather, the fluid in this gap is provided primarily to support relative rotation between the shaft sleeve and counterplate.

In contrast, the gap between the thrust plate adjacent to the journal bearing is at the small end of typical thrust plate bearing gaps, because of the fact that a groove pattern is provided on this surface, and it is necessary and desirable to provide both high axial and angular stiffness.

The hub assembly 13 is rotated with respect to the base 12 in use by means of an electromagnetic motor. The electromagnet motor comprises a stator assembly 52 mounted to the base 12, and a magnet 54 mounted to the journal sleeve 26.

As can be appreciated from FIG. 1, the hub assembly 13, which generally comprises the journal sleeve 26, hub 50, counterplate 36, and first and second porous lubricant reservoirs 42 and 44, is supported for rotation relative to the base 12 and shaft 14 on hydrodynamic bearings 28, 30, 34, and 38.

Figure 2:
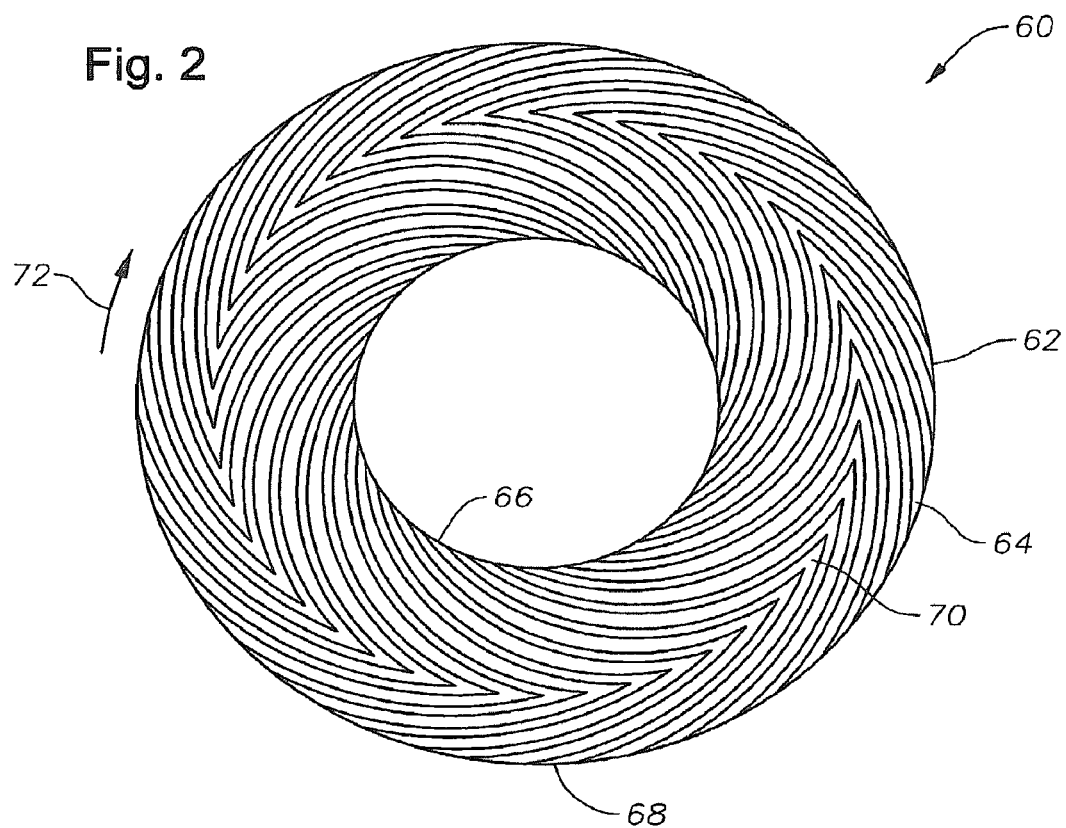
FIG. 2 is a plan view of one of the surfaces of a single thrust bearing.

The operation of a hydrodynamic bearing can best be understood by reference to FIG. 2, which illustrates a plan view of one of the surfaces of a hydrodynamic thrust bearing., The illustrated hydrodynamic bearing surface, generally indicated by the numeral 60, comprises a series of alternating grooves 62 and lands 64. Each groove 62 and land 64 comprises a leg which extends outward from the inner radius 66 of the hydrodynamic bearing surface 60 and a leg which extends inward from the outer radius 68 of the hydrodynamic bearing surface 60. The two legs in a point at an intermediate radius 70. The plurality of grooves 62 and lands 64 together form a curved herringbone pattern as illustrated in the figure.

A hydrodynamic thrust bearing is formed when the bearing surface 60 is placed adjacent to an opposed bearing surface with a film of lubricant between the two surfaces. When the bearing surface 60 is rotated in the direction 72, against the herringbone pattern, the grooves 62 and lands 64 tend to draw lubricant from the inner and outer radii 66 and 68 towards the points of the herringbone pattern at 70. This creates a radial pressure distribution within the lubricant which serves to keep the bearing surfaces apart under external loading.

By varying the pattern of grooves 62 and the lands 64 in a known fashion, the pressure distribution across the hydrodynamic bearing can be varied In particular, if the pressure in the bearing lubricant is greater at the inner radius 66 than at the outer radius 68 during operation, a new flow of lubricant from the inner radius 66 to the outer radius 68 will result, and vice versa. This can be done, for example, by having the intermediate radius 70, at which the points of the herringbone (or spiral) pattern are located, closer to the outer radius 68. The pressure distribution amplitude across the hydrodynamic bearing can be varied by various means including altering the design of the grooves. The significance of having a net flow of lubricant across the bearing surface is discussed below.

The grooves 62 and lands 64 may be formed in the hydrodynamic bearing surface by any number of means including, for example, chemical machining or stamping.

Although the operation of a hydrodynamic bearing has been discussed with reference to a hydrodynamic thrust bearing, it will be appreciated that the above principles can be applied to a hydrodynamic journal bearing such as the hydrodynamic journal bearings 28 and 30 illustrated in FIG. 1. In particular, the pattern of the grooves and lands of the hydrodynamic journal bearings 28, 30 can be arranged to create a net flow of lubricant in a direction along the longitudinal axis of the shaft 14, i.e. towards or away from the base 12; in this case it is toward the thrust bearing.

It will also be appreciated that a hydrodynamic bearing is not limited to the use of a herringbone pattern of grooves 62 and lands 64. For example, a spiral or sinusoidal pattern may be used as an alternative to the herringbone pattern. The herringbone pattern is however preferred for thrust bearing arrangements as it generates a pressure distribution across the bearing surface which provides improved bearing rocking stiffness. Bearing rocking stiffness is a measure of the ability of a thrust bearing to resist rotation of the bearing surfaces relative to one another about an axis traverse to the axis of rotation of the thrust bearing.

Referring again to FIG. 1, in use the hub assembly 13 (generally comprising the journal sleeve 26, counterplate 36, porous lubricant reservoirs 42 and 44 and the hub sleeve 50) is rotated relative to the base 12 by means of an electromagnetic motor comprising stator assembly 52 and magnet 54. The hub assembly is supported for smooth rotation on the shaft 14 and thrust plate 32 by the pressures generated in the lubricant at the hydrodynamic bearings 28, 30, 34 and 38.

The present design seeks to minimize the power consumption which is typically associated with the use of a two-sided thrust bearing. This power consumption comes from the fact that in the typical design which uses a thrust plate with a bearing on either side of the thrust plate provides the desired level of axial stiffness. The viscosity of the fluids used in the gap is relatively high at low temperatures, thus the drag on the grooved surfaces of a dual thrust bearing design i.e. one with grooves on both axially facing surfaces is quite high. The approach herein of using one rather than two fluid dynamic thrust bearings will reduce the power consumed. As already have been described, the journal bearing comprises grooves along one of the shaft 20 or the facing sleeve 26. Typically the journal bearing is in two sections; in the present design, shown in FIGS. 3A, 3B and 3C the design is modified so that a net pumping action along the journal bearing toward the thrust plate is established. This net pumping is referenced by the arrow 302 drawn along the shaft 300, and can be established according to the skill in the art in any of the number of ways. One approach is to modify the design of the grooves which are used to establish the journal bearing along the shaft. Alternatively, in an instance where two sets of grooves are defined along the journal bearing, one of these, typically the journal bearing most distant from the thrust plate 28 is made longer than the other set of grooves. This alteration produces an asymmetric pumping action toward the thrust plate 304.

In preferred embodiments, the thrust bearing would be a chevron pattern or a spiral or similar to add pressure to the asymmetric pressure acting on the thrust plate face, although a spiral design, in a preferred form, would include a circulation path across the thrust plate inner diameter.

As shown in the schematic diagram of FIG. 3A, the journal asymmetry pumping pressure 302 can be set to act as a constant force to axially bias the shaft 300 and thrust plate 304 relative to the surrounding sleeve and counterplate by pumping sufficient fluid into the gap 310 between the thrust plate surface 312 and the sleeve shoulder 313 shown on FIG. 3B; and further pumping fluid into the gap 320 between the thrust plate surface 322 distal from the shaft and the facing surface 323 on the counterplate so that a constant journal asymmetry pressure 330, and 332 (the pressures preferably being substantially equal) is achieved to produce a force equilibrium which allows for free rotation of the shaft and thrust plate relative to the sleeve and counterplate. It is known that pressure times surface area equals force. In this instance, the net pressure 340 times the thrust plate surface area is substantially equal to the journal asymmetric pressure times the shaft end surface area.

By grooving the thrust plate surface 312 or the facing surface 313 of the sleeve, a thrust bearing is established which provides the generally triangular additional force as a function of gap represented by the regions 340, 342 of the pressure diagram (FIG. 3A) to suspend and maintain the separation of the thrust plate 304 from the adjacent surfaces. It should be noted that the grooved thrust plate region not only contributes to the maintenance of the separation of that shoulder of that surface from the facing shoulder, but referring to FIG. 3B it can be seen that the shaft asymmetry pressure 302 contributes primarily to (and will typically be equal to) the pressure 351 which is created at the distal end of the shaft 350 which faces the counterplate 352. The pressure in the adjacent regions generally indicated at 354, 356 (FIG. 3B) is primarily established by the pumping effect of the thrust plate bearing 312.

Thus, in a preferred embodiment, it is believed that by properly establishing the journal asymmetry pressure 302, that this will be the primary contributor to the force 350 which presses against the shaft to maintain the separation of the end of the shaft from the counterplate.

The thrust bearing 312 would typically be a chevron pattern or an outward spiral, as is well known in the art, which can add to the pressure on the gap surface 312 as well as contributing to the pressure established at the opposed thrust plate regions 354, 356. This grooved thrust bearing can be designed to operate at a relatively small effective gap 310, such that a high axially and angular stiffness and efficiency can be achieved. The ungrooved gap 320 between the shaft face and the counterplate 312 as well as between the thrust plate surface 322 and the counterplate 312 can be larger and lower precision than in normal dual thrust plate bearings of the prior art. The pressure in this gap 320 is a substantially constant pressure independent of thrust gap that is equal to journal asymmetry pressure. This region now acts primarily as a shock displacement limiter, shaft landing zone and journal asymmetry pressurization region.

It can be seen by a person of skill in the art who has reviewed this disclosure that the single thrust bearing with a reduced diameter, which may be used pursuant to the present design, will consume less power than the dual thrust bearing design of the known art, because of the use of one thrust gap instead of two. Further, the angular stiffness which is necessary in designs such as disc drives will be achieved through the reduced bearing gap of the single thrust bearing adjacent the journal bearing.

Figure 3C:
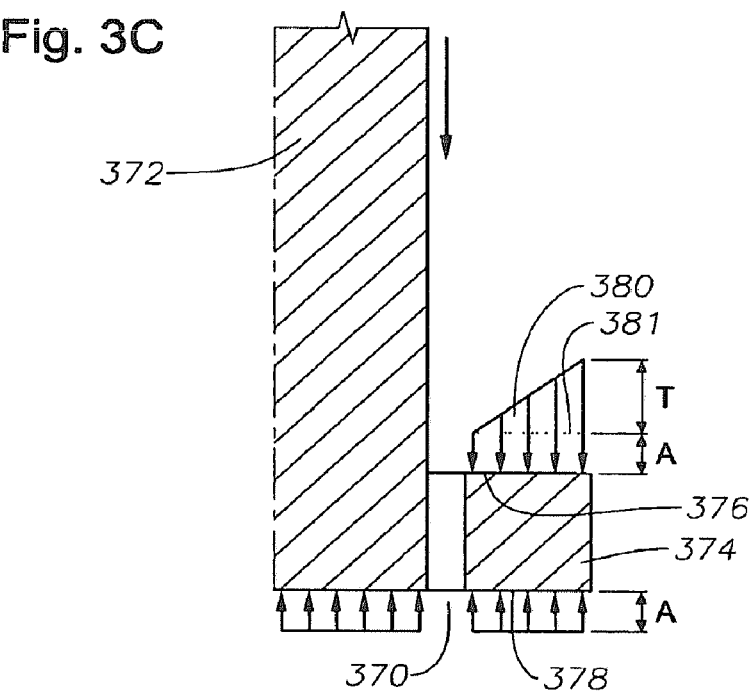

In addition, cost reduction is achieved because only a single bearing grooving process is required on the sleeve to form the journal, and the single set of thrust bearing grooves. The grooving process for the counterplate, or the thrust plate surface which normally faces the counterplate does not need to be carried out. Further, the counterplate is made as a less high precision part; only medium precision is needed since this part does not act as a bearing surface. It is further believed that recirculation holes or pressure venting ports should not be required in many embodiments of this design, further simplifying the part manufacturing process. Finally, since the journal asymmetry pressure is utilized as a constant thrust bias force, other sources of biasing such as magnetic magnets or the like are not needed, thereby eliminating such parts and the tolerances associated therewith. An alternative embodiment is shown in FIG. 3C; the primary distinction between this and other embodiments is the use of a circulation hole or holes 370 which are defined across the thrust plate inner diameter. Pursuant to this approach, which is similar in other respects to FIGS. 3A and 3B, an asymmetric journal pressure A is developed axially along shaft 372, biased toward thrust plate 374. This pressure appears as pressure A against both the grooved surface 376 and the ungrooved surface 378 of thrust plate 374. Further, the grooves (not shown) on surface 376 generate a net spiral thrust pressure T represented by the triangular region biased on dotted line 381. For the desirable force equilibrium wherein the shaft and thrust plate and the sleeve are supported for relative rotation, T*TA=A*SA (wherein A*TA cancels i.e. the top vs. bottom pressures). The circulation holes 370 can be used with chevron or spiral grooves, but are especially necessary with a spiral groove pattern.

Other features and advantages of this invention will be apparent to a person of skill in the art who studies the disclosure. Therefore, the scope of the invention is to be limited only by the claims.

What is claimed is:

1. A method comprising:
    defining a fluid dynamic journal bearing between a bore and a shaft, wherein the bore is defined by a sleeve and the fluid dynamic journal bearing supports rotation of the shaft and the sleeve relative to one another;
    coupling a thrust plate transversely to the shaft, wherein the thrust plate has a first axial thrust surface and an ungrooved second axial surface, the first thrust surface and a sleeve thrust surface defining together a first fluid dynamic thrust bearing;
    defining an asymmetrical journal bearing between the shaft and the sleeve, wherein the asymmetrical journal bearing establishes an asymmetric pressure directed toward the first fluid dynamic thrust bearing; and
    mounting an ungrooved counterplate to the sleeve which, together with the ungrooved second axial surface of the thrust plate, defines a gap that is in fluid communication with the first fluid dynamic thrust bearing and the fluid dynamic journal bearing, wherein the asymmetric pressure defined by the asymmetric journal bearing is further operable to act against a portion of the ungrooved second axial surface disposed radially inward of the radius of the shaft to support distancing of the ungrooved second axial surface from the counterplate.

2. The method of claim 1, wherein the asymmetric journal bearing comprises a grooved surface on one of the sleeve or the shaft to create pumping action toward the thrust plate along the shaft.

3. The method of claim 2, wherein the thrust bearing pattern is chosen from a group comprising a chevron pattern and a spiral groove pattern.

4. The method of claim 2, further comprising extending a circulation path from a second thrust plate gap to the journal bearing.

5. The method of claim 3, wherein the circulation path comprises a groove extending axially across the thrust plate.

6. The method of claim 1, wherein the journal bearing comprises first and second sets of grooves along the gap between the shaft and the sleeve, the second set of grooves being more distant from the thrust plate than the first set of grooves and being modified relative to the first set of grooves to create the journal asymmetric pumping action toward the thrust plate along the shaft.

7. The method of claim 6, wherein, in operation, the gap between the thrust plate second surface and the counterplate is substantially larger than the gap between a first thrust plate groove surface and the sleeve transverse surface.

8. The method of claim 1, wherein a the grooved pattern on a thrust plate surface is a balanced-groove pattern, and the thrust apex diameter is slightly displaced toward the distal edge of the thrust plate from the shaft.

9. The method of claim 1, wherein the journal bearing creates asymmetry pumping pressure sufficient to act as a constant force to axially bias the spacing of the thrust plate relative to the sleeve surface and counterplate surface such that a first thrust plate grooved surface gap with the transverse sleeve surface closes until axial force equilibrium is achieved.

* * * * *